US012810204B2

(12) United States Patent
Noble et al.

(10) Patent No.: US 12,810,204 B2
(45) Date of Patent: Nov. 24, 2026

(54) ACTIVE SEARCH-BASED APPROACH FOR SENSOR QUERYING IN GEOGRAPHICALLY OVERLAPPING EDGE NETWORKS

(71) Applicant: Dell Products L.P., Round Rock, TX (US)

(72) Inventors: Diego Vrague Noble, Pelotas (BR); Eduardo Vera Sousa, Niterói (BR); Karen Braga Enes, Belo Horizonte (BR); Karen Stéfany Martins, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 637 days.

(21) Appl. No.: 18/364,176

(22) Filed: Aug. 2, 2023

(65) Prior Publication Data

US 2025/0045625 A1 Feb. 6, 2025

(51) Int. Cl.
*G06N 20/00* (2019.01)
*G06F 16/901* (2019.01)
*G06F 16/903* (2019.01)

(52) U.S. Cl.
CPC ......... *G06N 20/00* (2019.01); *G06F 16/9024* (2019.01); *G06F 16/90335* (2019.01)

(58) Field of Classification Search
CPC .............. G06N 20/00; G06F 16/90335; G06F 16/9024
USPC .............................................................. 706/12
See application file for complete search history.

(56) References Cited

U.S. PATENT DOCUMENTS

2023/0111177 A1* 4/2023 Noel .................. G06F 9/45558 726/23

OTHER PUBLICATIONS

Wang, X., Garnett, R., & Schneider, J. (2013). Active search on graphs. Proceedings of the 19th ACM SIGKDD International Conference on Knowledge Discovery and Data Mining, 731-738.

* cited by examiner

*Primary Examiner* — Hung T Vy
(74) *Attorney, Agent, or Firm* — Workman Nydegger

(57) ABSTRACT

An active search based approach for performing queries in networks, including geographically overlapping networks, is disclosed. After generating a graph representing devices operating in one or more networks, feature sets of the devices are retrieved and stored in corresponding nodes. When performing a query, a small set of nodes is used to train a model, such as a classifier, and the graph is searched for nodes that are part of a particular class. When a sufficient number of nodes are identified, which is much less than the number of nodes in the graph, the corresponding devices are queried and the resulting data may be used to perform an action.

20 Claims, 6 Drawing Sheets

ACTIVE SEARCH-BASED APPROACH FOR SENSOR QUERYING IN GEOGRAPHICALLY OVERLAPPING EDGE NETWORKS

FIELD OF THE INVENTION

Embodiments of the present invention generally relate to performing queries in network. More particularly, at least some embodiments of the invention relate to systems, hardware, software, computer-readable media, and methods for querying for selectively performing queries in a network.

BACKGROUND

Networks are becoming ubiquitous and many of these networks may overlap geographically. Multiple cellular networks, for example, often overlap geographically. Each of these networks may be associated with or used by large numbers of devices. Many of these devices are capable of performing various actions, which may be related to data. Camera devices, for example, can collect or generate image data and GPS (Global Positioning System) devices can generate or provide position data.

The devices connected to a network can be represented as a graph. Each node of the graph may represent a different device. The vertices of a graph that represents devices connected to a network can store information about the devices. For various reasons, accessing the data associated with the various nodes from the devices operating in the network has a steep cost. In fact, a large fraction of the data to be modeled or accessed is only partially observable. This makes searching for relevant data difficult. The challenge faced, from a searching perspective, is to identify a set of target devices in the context of limited observability and search cost.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
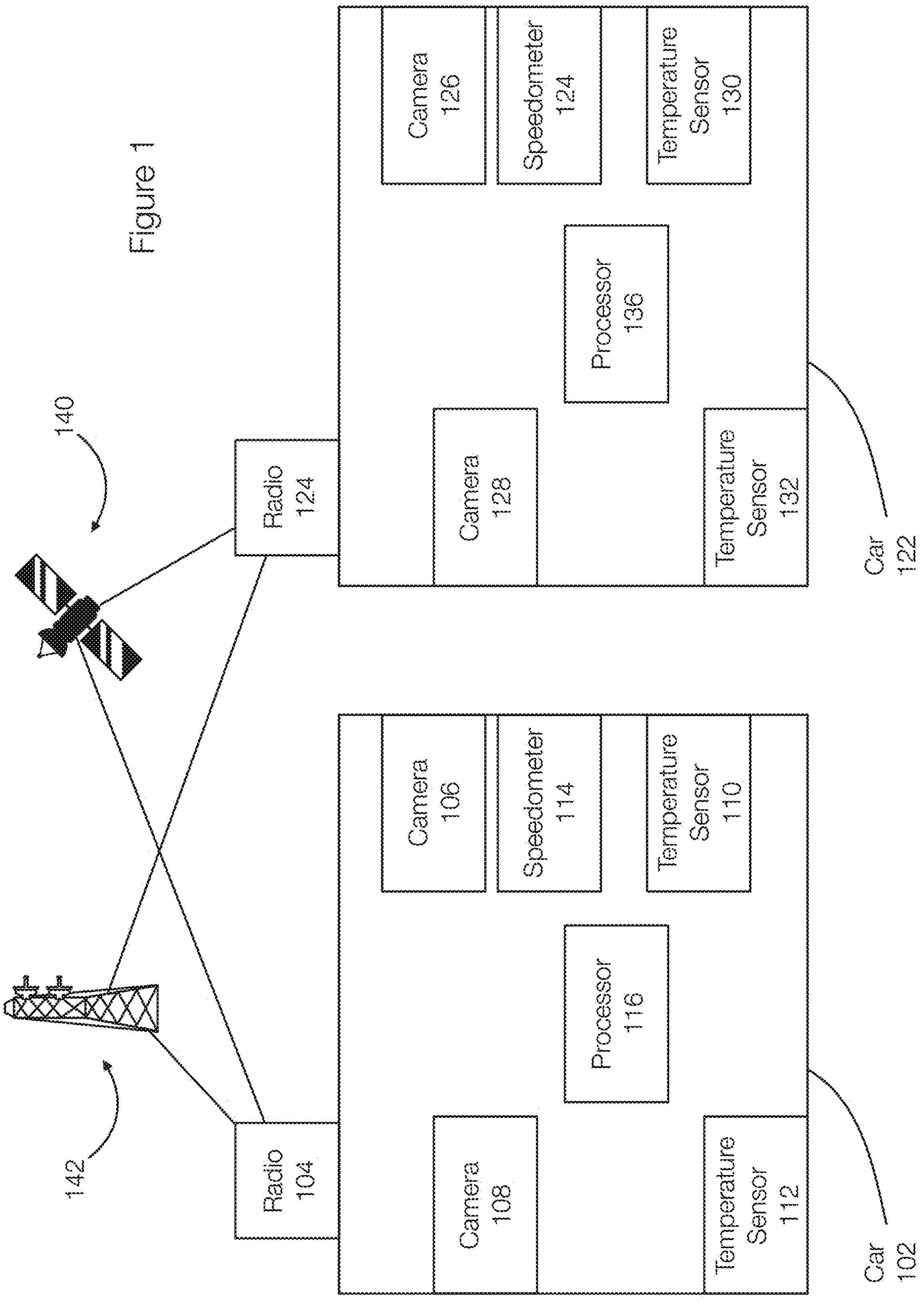
FIG. 1 discloses aspects of devices operating in one or more networks.

Embodiments of the present invention generally relate to performing queries or searches in networks. More particularly, at least some embodiments of the invention relate to systems, hardware, software, computer-readable media, and methods for performing queries in geographically overlapping networks.

When there is a need to perform queries in a network, embodiments of the invention relate to identifying specific devices for the querying operation. Because querying is often cost-limited, embodiments of the invention relate to identifying the devices that are more likely to have the data being sought. This is often difficult, at least because a network may be associated with very large numbers of devices (e.g., thousands, hundreds of thousands, millions).

For example, a user may desire to acquire information related to a weather event. Embodiments of the invention may identify devices that are likely to have the capability of obtaining relevant information. When the devices are represented as nodes in a graph, each of the nodes can be associated with feature sets or feature vectors that describe its capabilities. Some devices, for example, may have multiple cameras while other devices may have only a single camera. Some devices may have microphones and thermometers while other devices may not have microphones or thermometers. Some devices may have GPS capabilities, infrared imaging capabilities, or the like.

In the context of a weather event, it may be useful to query devices that are classified as weather devices. In one example, a classifier may be trained to classify a node (or the associated device) using a feature set. Devices corresponding to the nodes that are classified as weather devices may be queried for information related to the weather event. For example, a device with multiple cameras and a microphone may be more likely to be classified as a weather device compared to a device with no cameras.

The graph may be searched for these devices. Because the search may be limited in terms of the number of queries that can be performed in the network, the search is conducted until K (the query limit) nodes are identified. The devices corresponding to the nodes identified by the search are queried for data. Actions are performed based on the results. For example, a weather alert may be generated. The query limit may be defined in terms of queries to the graph and/or queries to the devices in the network.

One approach for searching a graph is referred to as Active Search. Active search on graphs is a technique for finding the largest number of target nodes—i.e., nodes with a certain label—in a network by querying the nodes in a graph, under a query budget constraint. In one example, the nodes have hidden labels, but the network topology and edge weights are fully observable, and any node can be queried at any time. Embodiments of the invention relate to performing queries in a graph to discover members of a certain class in the context of a limited budget.

One objective of Active Search is to uncover or find as many target nodes as possible using the least number of queries to the graph interface. A node's label is revealed only after querying the graph via a graph interface and embodiments of the invention reduce or minimize the number of queries while increasing or maximizing the number of target nodes.

As previously stated, searching the graph may operate under a budget which may be viewed in terms of cost, time, or the like. In one example, the budget can be considered a proxy to the number of queries allowed to be made to the network. A typical algorithm builds a model from the labels already collected and iteratively uses the model to select the next point for labeling that is expected to most improve the model. In one example, the search in the graph is oriented on the features of the nodes. A classifier or classification model looks at all available nodes in an iteration and determines, based on the model's learning about the features of the nodes, which node is most likely to satisfy the requirements. In one example, the model may be trained with a very small set of nodes (compared to the number of nodes in the graph). As the graph is traversed in one or more iterations, the nodes searched can be added to the training of the model in the event that an insufficient number of nodes are identified during a previous iteration.

By way of example only, embodiments of the invention may search for data captured by some device (e.g., a sensor, a group of sensors, or the like) in a geographic region with multiple networks. This is achieved by initially generating a feature set for each node of each network that covers or is associated with the target geographic location or with a network. This feature set may contain representatives from the data or metadata collected by the node and data distributions, for example.

Next, an Active Search algorithm is applied to find the m nodes (called target nodes) that are currently placed in the same geographic region, regardless of which part of the network the node is connected to. In this example, $m \ll M$, where M is the total number of nodes in the networks. Next, data is collected from the target nodes and the desired action (e.g., notify the edge nodes, train some specific model, or collect an inference about the data, like the probability of a snowstorm, for example) is performed.

By representing the devices connected to a network as nodes or by representing devices connected to different networks in the same graph, a search can be performed to select nodes that may capture specific data. The data can be used to perform an action or operation in the network or networks. By considering the availability of multiple networks in the same geographical region, the amount of relevant data for a specific task can be increased (because more nodes in the same area can be explored). Further, this may provide a redundant link such that, if a device cannot connect on one network, the device may connect to a different network.

As previously stated, real-world problems can often be modeled as a graph structure capable of representing entities and different relationships between them. As previously indicated, a large fraction of the data that may be useful is unobserved. This inability to observe all data is complicated by the fact that the ability to perform queries to explore and discover useful information is budget constrained.

Because the acquired data may be costly, embodiments of the invention are interested in a set of target nodes (e.g., those with a desired characteristic) rather than all nodes in the network. From this perspective, exploring the entire network domain may not be an intelligent or practical decision, due in part to the querying costs. Active Search (AS) in partially observable graphs relates to searching for members of a particular set in an environment that is partially observable to an agent. More specifically, the agent's objective is to find as many members (nodes or edges, depending on the goal) as possible using the least number of queries to an environment. The environment is usually a graph and nodes represent the objects (devices, sensors, or the like) that carry a label. Although the entire network is available, labels are only revealed after the query, hence the partially observed feature.

In geographically overlapping edge networks, various devices may generate redundant data such as the temperature of a room or different angles of the same area of interest. Notwithstanding, determining which devices hold relevant data with regards to a given incident can be a challenging problem if it is necessary to quickly determine which devices are closer to each other at a specific location and time. Querying all the devices in the network can be costly and onerous in an emergency scenario.

In a connected cars scenario, for example, it may be useful to query all cars with front cameras in similar regions, such as those in areas with fallen trees. In addition, another possible scenario would be collecting temperature variations from nodes within a region to send notifications about a weather event. Notice that the regions in these examples could be affected by different mobile networks with some geographic overlap. In this example, querying all the networks to find specific nodes would be a high-cost task.

FIG. 1 discloses aspects of connected devices. More specifically, FIG. 1 illustrates an example of connected cars. The car 102 may include various sensors, by way of example and not limitation, such as a front camera 106, a rear camera 108, a speedometer 114, an engine temperature sensor 110, wheel temperature sensors 112, and the like. A processor 116 may be configured to control, operate, query, or the like with regard to these sensors. The car 122 is similarly configured with a processor 136 and sensors such as cameras 126 and 128, a speedometer 124, and temperature sensors 130 and 132.

The car 102 may include a radio 104 configured to communicate with, in this example, a satellite 140, and the car 122 may include a radio configured for communicating with a satellite 140. Alternatively, or in addition, the cars 102 and 122 may be configured to communicate over a cellular network 142. The cars 102 and 122 may also have the ability to connect to other network types (e.g., Wi-Fi). This arrangement may allow the cars 102 and 122 to have redundant communication channels, be connected to disparate and different networks, or the like.

Figure 2:
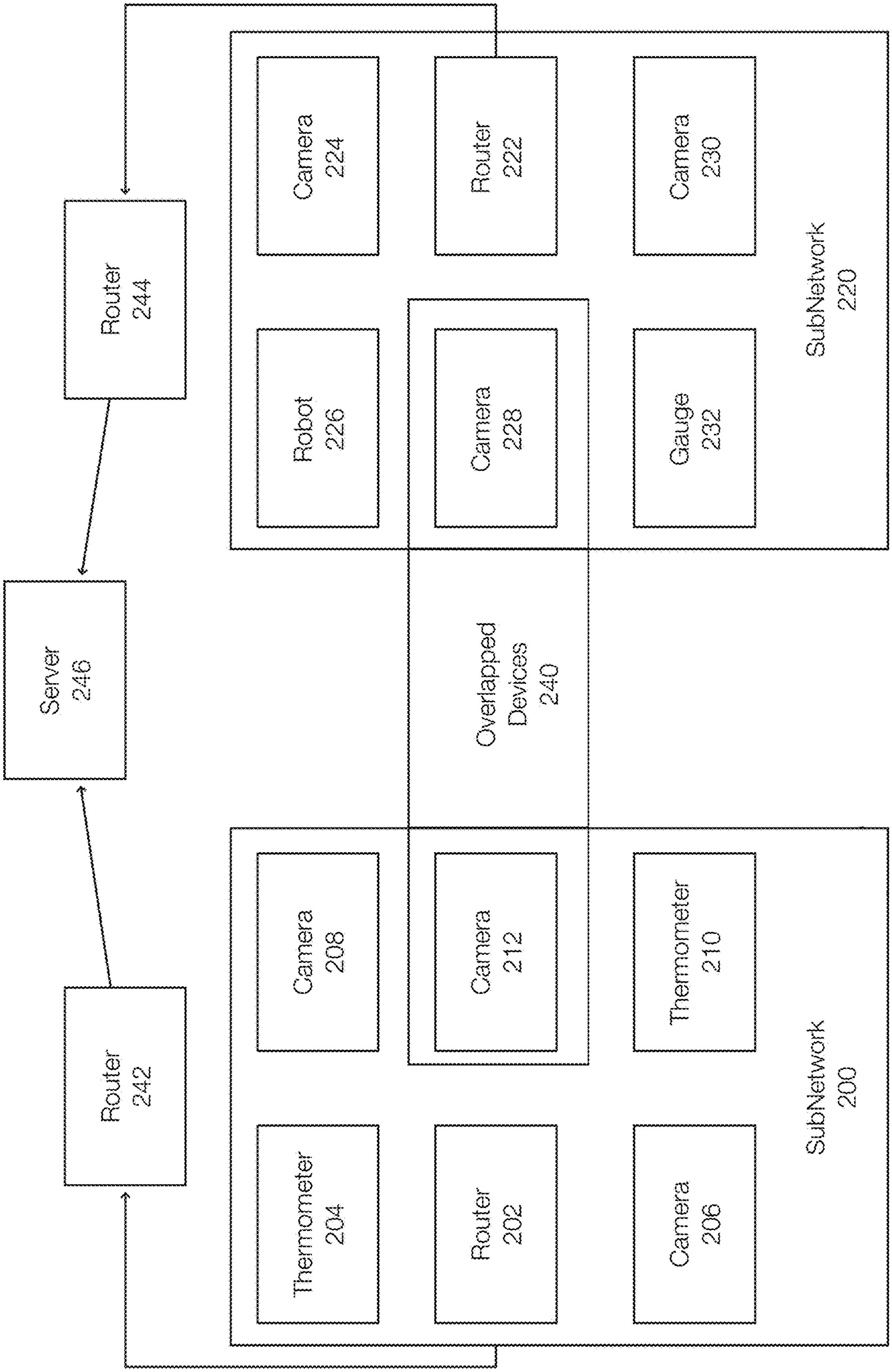
FIG. 2 discloses additional aspects of devices operating in one or more networks.

FIG. 2 discloses aspects of geographically overlapping networks. FIG. 2 illustrates a subnetwork 200 and a subnetwork 220. The subnetwork 200 includes nodes or devices such as a thermometer 204, a camera 208, a camera 212, a camera 206 and a thermometer 210. The subnetwork 220 includes nodes or devices such as a robot 226, a camera 224, a camera 228, a gauge 232 (e.g., speedometer, temperature, pressure), and a camera 230. The router 222 of the subnetwork 220 is connected with a router 244, which connects to a server 246. The router 202 of the subnetwork 200 connects to a router 232, which then connects to a server 246.

FIG. 2 illustrates that the camera 212 and the camera 228 are overlapped devices 240. In other words, the camera 212 and the camera 228 may take or generate images of the same geographical area. However, the view or perspective of the cameras 212 and 228 may be different. The subnetwork 200 and the subnetwork 220 may be, by way of example, connected cars, subnetworks in a warehouse, building complex, or the like.

Figure 3:
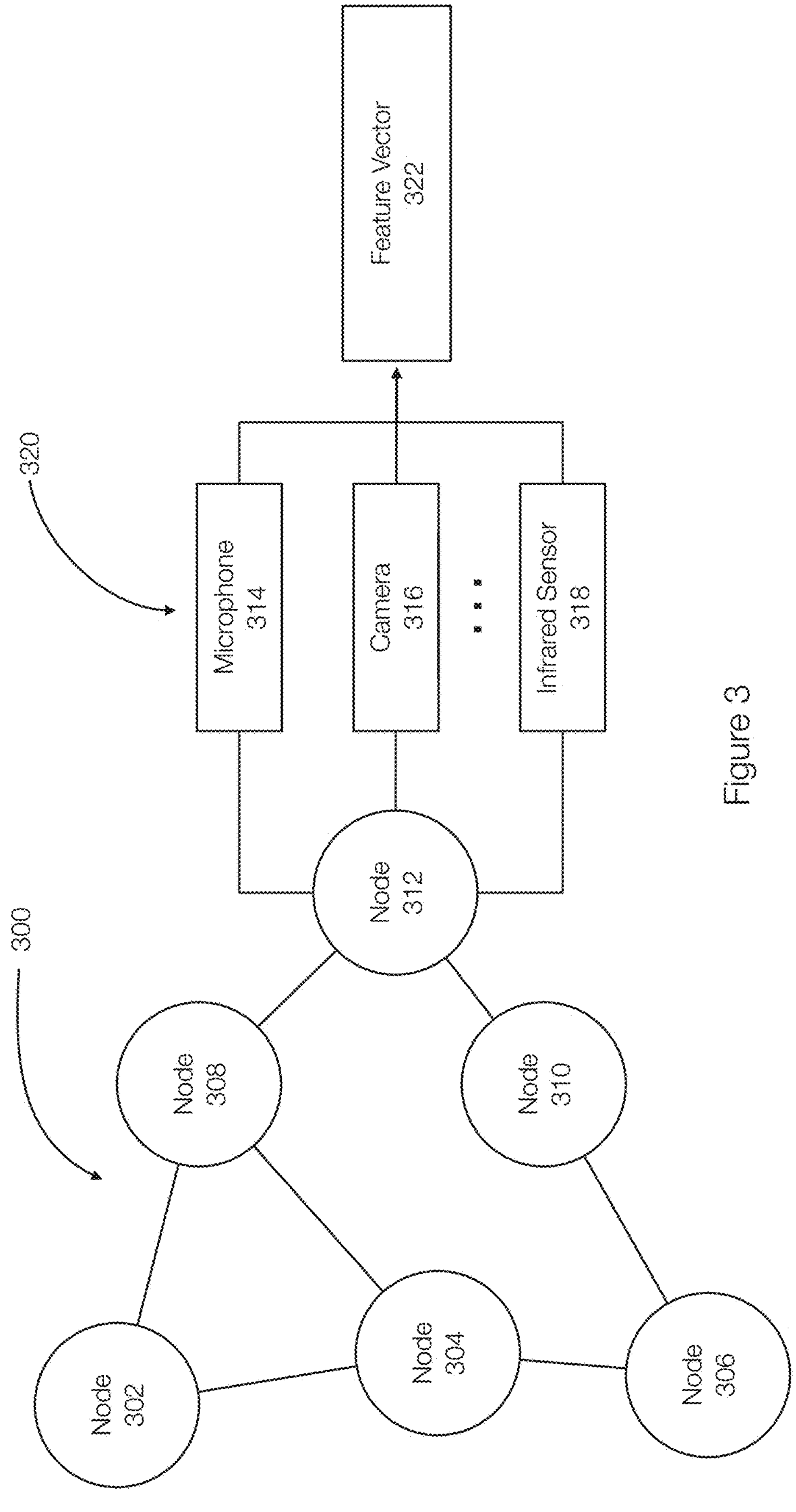
FIG. 3 discloses aspects of a graph and aspects of features associated with nodes of the graph.

FIG. 3 discloses aspects of a graph configured to model a network (or multiple networks). The graph 300 includes edges and vertices. Each of the vertices is a node of the graph 300. The graph includes nodes 302, 304, 406, 308, 310, and 312, which each represent a device operating in a network (e.g., a connected car, a robot, a drone, smartphone, sensor, or other device). In this example, the device represented by the node 312 may include various sensors or devices. The node 312 is associated with metadata or features 320 that describe the sensors. In this example, the features 320 of the node 312 include a microphone 314, a camera 316, and an infrared sensor 318. In other words, the features 320 represent the devices or sensors available at the device represented by the node 312.

In one example, the features of each of the devices may be collected and stored in the nodes of the graph 300. Thus, each node may be associated with a feature vector. The feature vector 322 of the node 312 represents the features 320 of the corresponding device. The features may be more descriptive and may include additional metadata. For example, metadata of a camera may include whether the camera is greyscale or color, continuous or periodic, resolution, aperture, or the like. Metadata of a microphone may include echo cancelling features, frequency response, or the like. Each of the sensors may have this type of metadata, which may allow a classifier to classify each of the nodes (or devices).

Figure 4:
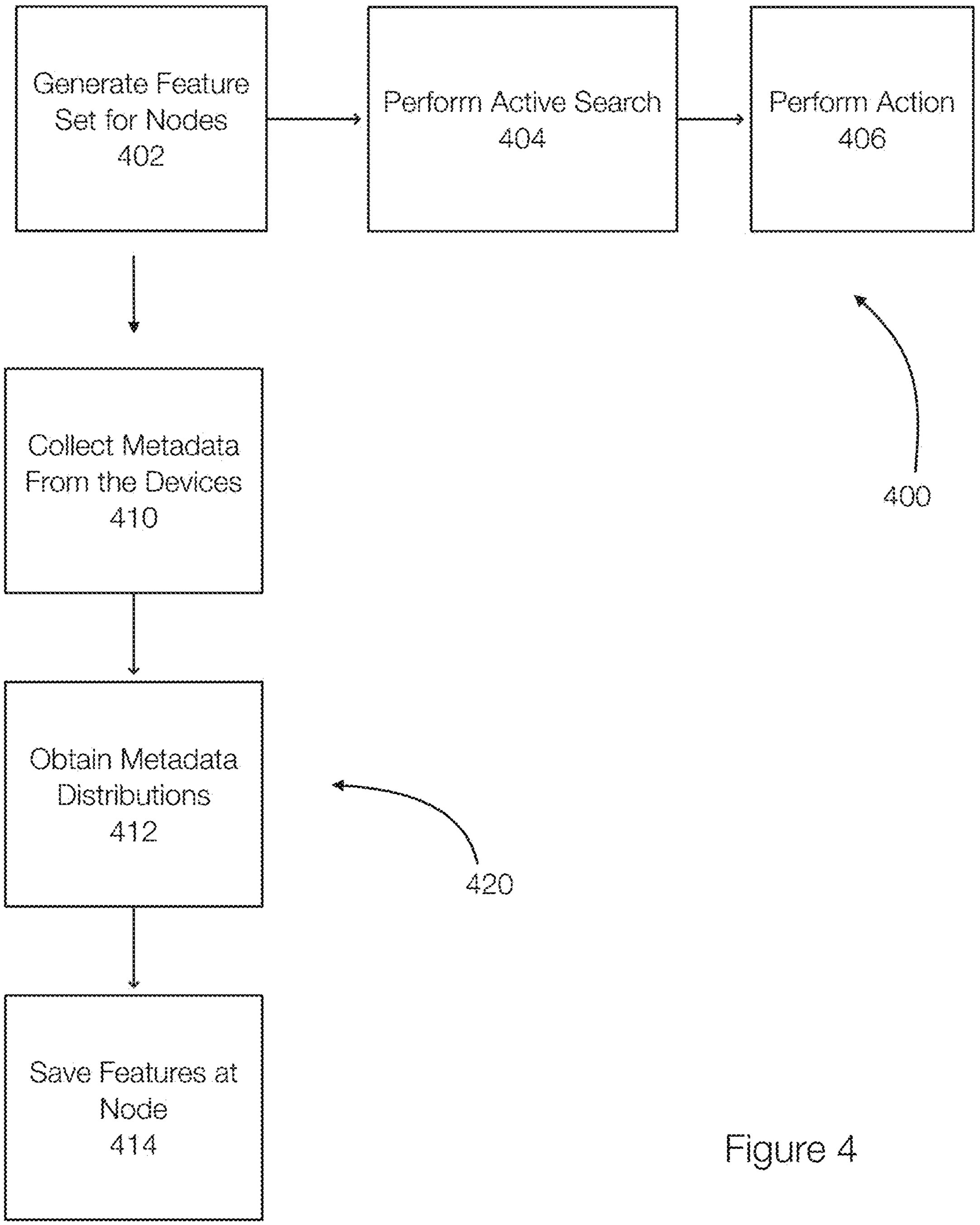
FIG. 4 discloses aspects of building feature sets.

FIG. 4 discloses aspects of searching a graph and querying devices in one or more networks. The method 400 includes generating a feature set for each of the devices. The feature set of each device is stored at a corresponding node in the graph.

More specifically, the method 400 thus includes a first phase 420 of generating 402 features sets for the nodes. Generating 402 the feature sets for the nodes of the graphs may include collecting 410 metadata from each of the devices in the network. Data distributions 412 for the collected metadata may be generated and stored. The data distributions may impact a performance of the classifier and may be used to tune hyperparameters for example. The data distributions may also be used for defining feature importance. Finally, the features of each device are saved 414 or stored at the corresponding node of the graph.

Figure 5:
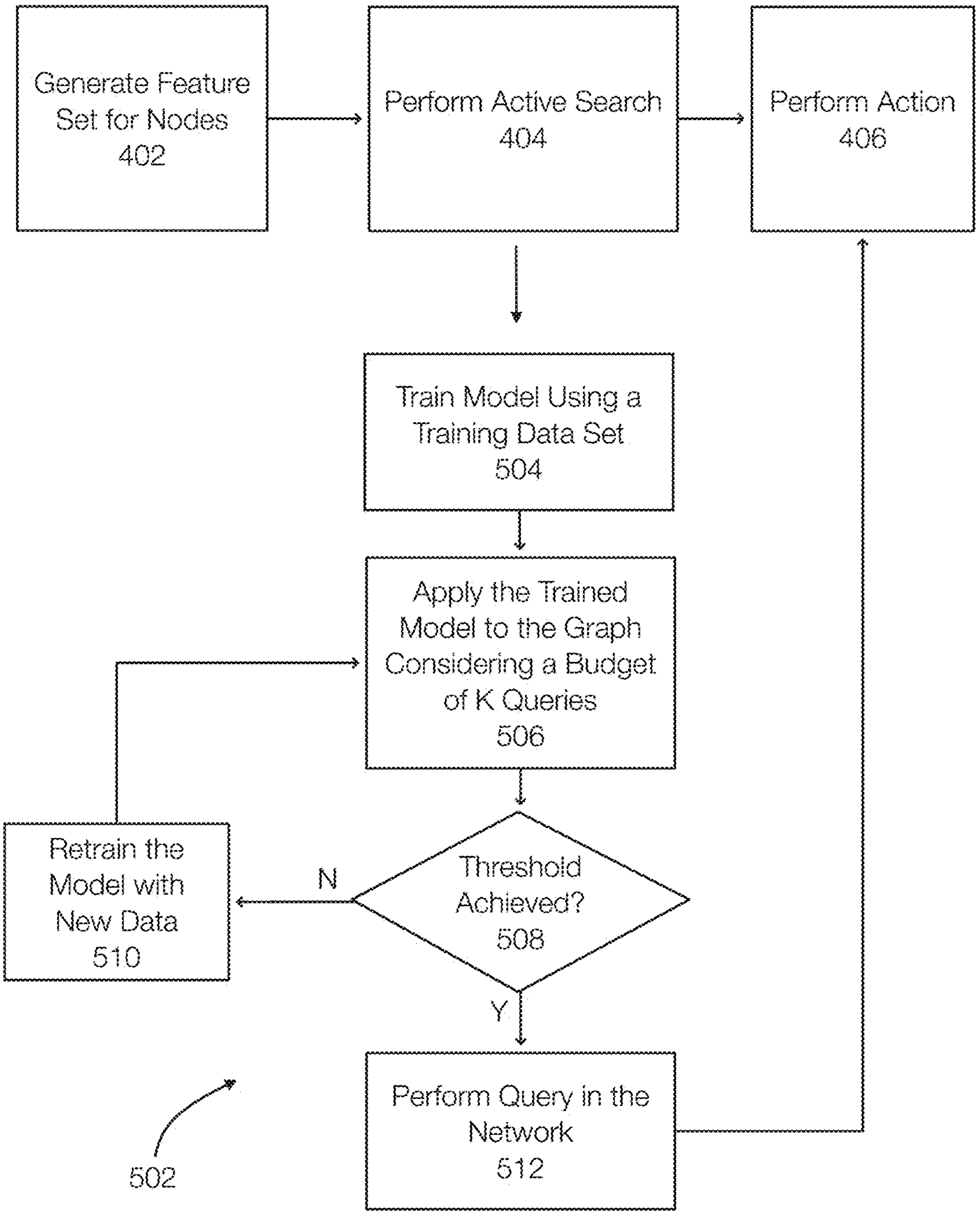
FIG. 5 discloses aspects of performing a search and performing actions based on search results.

FIG. 5 illustrates a second phase of performing a query in one or more networks. The second phase 502 includes using the data or features (e.g., the feature vectors) of the nodes to train a model, which may be a classifier. In one example, some of the nodes of the graph are selected and used as a training set to train 504 a model. In one example, the model may be configured to classify or categorize a node into one of multiple classes.

The initial training data set may include a cold start that includes features from a very small sample of nodes, which may represent multiple classes. The training data set may be obtained from random nodes in the graph, by performing a random walk in the graph, or using a pre-selected set of nodes. Information about the classes being searched for may also be provided.

Once the model is trained, the model is applied 506 to the graph while considering a budget of K queries. In one example, the goal is to identify and query the maximum number of nodes (or devices corresponding to the nodes) from a desired class of interest. Thus, a determination is made to determine if a threshold of K nodes have been identified. If the threshold is not satisfied (N at 508), then the model is retrained using the feature vectors or data of the nodes that were identified in the search. This process may be performed iteratively until the threshold is satisfied.

If the threshold is satisfied (Y at 508), the devices corresponding to the identified nodes in the network are queried 512. An action is performed 406 based on the results of the query.

More specifically, the phase 502 is configured to identify a maximum number of nodes from a desired class of interest. The devices or nodes identify during the phase 502 can be queried.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, searching operations, classification operations, active search operations, feature set related operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients, applications, or systems, that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of data of objects, in analog, digital, or other form. Rather, such principles are equally applicable to any object capable of representing information.

It is noted that any operation(s) of any of these methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: generating a feature set for each node in a graph, wherein the feature set describes features of a corresponding device operating in a network, performing a search based on the feature sets of the nodes to identify a set of nodes of a particular class based on a budget of K queries, querying the devices associated with the set of nodes, and performing an action using data returned from querying the devices.

Embodiment 2. The method of embodiment 1, wherein the action includes notifying at least one device, training a model, or generating an inference.

Embodiment 3. The method of embodiment 1 and/or 2, wherein generating a feature set includes collecting metadata from each of the devices.

Embodiment 4. The method of embodiment 1, 2, and/or 3, wherein generating a feature set includes storing the feature sets of the devices in respective nodes of the graph.

Embodiment 5. The method of embodiment 1, 2, 3, and/or 4, wherein performing a search includes training a model using a training data set.

Embodiment 6. The method of embodiment 1, 2, 3, 4, and/or 5, wherein the training data set includes features from a set of nodes selected randomly from the graph, identified by performing a walk in the graph, or identified from a set of predetermined nodes.

Embodiment 7. The method of embodiment 1, 2, 3, 4, 5, and/or 6, wherein the set of nodes included in the training set represents multiple classes.

Embodiment 8. The method of embodiment 1, 2, 3, 4, 5, 6, and/or 7, further comprising applying the model to identify nodes of the particular class, wherein a new search is performed when the identified nodes is less than a threshold number of nodes by adding information from the identified nodes to the training data set and retraining the model.

Embodiment 9. The method of embodiment 1, 2, 3, 4, 5, 6, 7, and/or 8, wherein some of the devices are geographically overlapped devices.

Embodiment 10. The method of embodiment 1, 2, 3, 4, 5, 6, 7, 8, and/or 9, wherein some of the devices are included in a different network.

Embodiment 11. A method operable to perform any of the operations, methods, or processes, or any portion of any of these, disclosed herein.

Embodiment 12. A system, comprising hardware and/or software, operable to perform any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or client may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
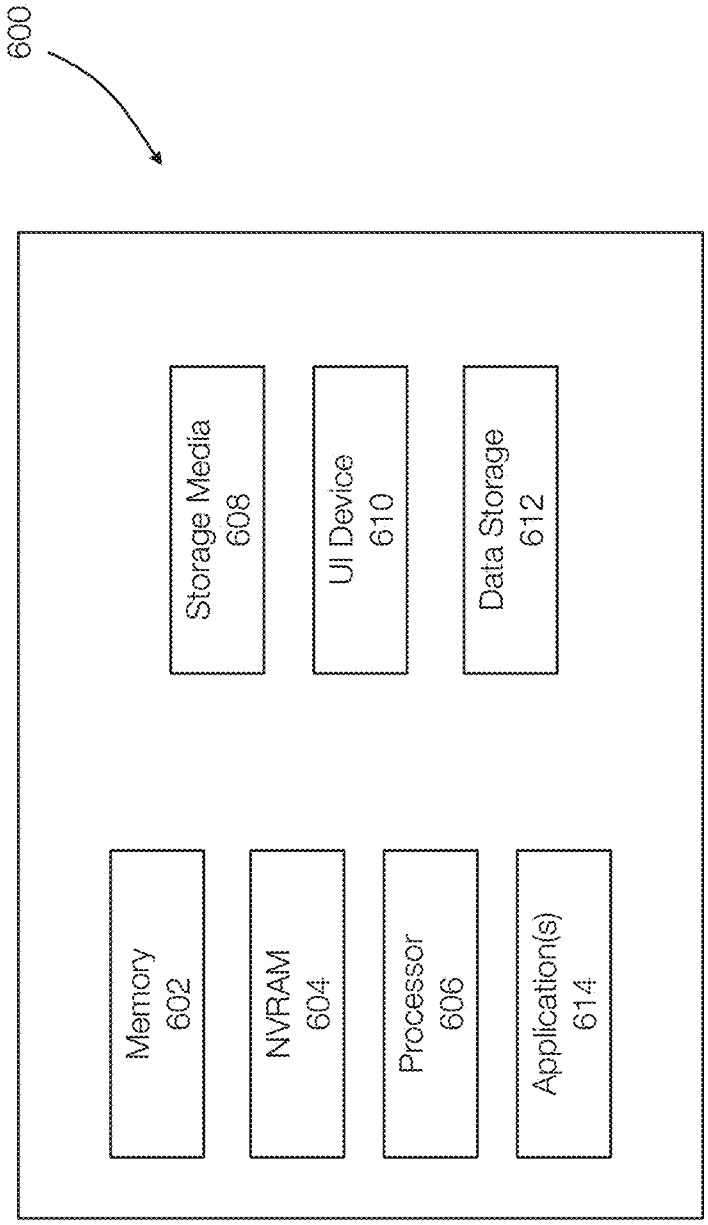
FIG. 6 discloses aspects of a computing system, device, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

generating a feature set for each node in a graph, wherein each node in the graph represents a corresponding device operating in one or more geographically overlapping networks, and wherein the feature set for each node is stored in the corresponding node of the graph and describes features of the corresponding device;

training a model using a training data set including feature sets from a subset of nodes in the graph;

performing an active search of the graph using the trained model and the stored feature sets to identify a set of nodes of a particular class based on a query budget defining a maximum number K of permitted queries to devices in the one or more geographically overlapping networks to reduce a number of network queries performed while identifying nodes of the particular class;

querying the devices associated with the identified set of nodes;

determining whether a threshold number of nodes of the particular class has been identified;

when the threshold number has not been identified, adding information from the identified nodes to the training data set, retraining the model, and repeating the active search of the graph; and performing an action using data returned from querying the devices.

2. The method of claim 1, wherein the action includes notifying at least one device, training a model, or generating an inference.

3. The method of claim 1, wherein generating a feature set includes collecting metadata from each of the devices.

4. The method of claim 3, wherein generating a feature set includes storing the feature sets of the devices in respective nodes of the graph.

5. The method of claim 1, wherein the model comprises a classifier configured to classify nodes of the graph into multiple classes.

6. The method of claim 1, wherein the training data set includes features from a set of nodes selected randomly from the graph, identified by performing a walk in the graph, or identified from a set of predetermined nodes.

7. The method of claim 6, wherein the set of nodes included in the training set represents multiple classes.

8. The method of claim 6, wherein the active search iteratively selects nodes predicted by the model to belong to the particular class.

9. The method of claim 8, wherein some of the devices are geographically overlapped devices.

10. The method of claim 1, wherein some of the devices are included in a different network.

11. A non-transitory storage medium having stored therein instructions that are executable by one or more hardware processors to perform operations comprising:

generating a feature set for each node in a graph, wherein each node in the graph represents a corresponding device operating in one or more geographically overlapping networks, and wherein the feature set for each node is stored in the corresponding node of the graph and describes features of the corresponding device;

training a model using a training data set including feature sets from a subset of nodes in the graph;

performing an active search of the graph using the trained model and the stored feature sets to identify a set of nodes of a particular class based on a query budget defining a maximum number K of permitted queries to devices in the one or more geographically overlapping networks to reduce a number of network queries performed while identifying nodes of the particular class;

querying the devices associated with the set of nodes;

determining whether a threshold number of nodes of the particular class has been identified;

when the threshold number has not been identified, adding information from the identified nodes to the training data set, retraining the model, and repeating the active search of the graph; and performing an action using data returned from querying the devices.

12. The non-transitory storage medium of claim 11, wherein the action includes notifying at least one device, training a model, or generating an inference.

13. The non-transitory storage medium of claim 11, wherein generating a feature set includes collecting metadata from each of the devices.

14. The non-transitory storage medium of claim 13, wherein generating a feature set includes storing the feature sets of the devices in respective nodes of the graph.

15. The non-transitory storage medium of claim 11, wherein the model comprises a classifier configured to classify nodes of the graph into multiple classes.

16. The non-transitory storage medium of claim 11, wherein the training data set includes features from a set of nodes selected randomly from the graph, identified by performing a walk in the graph, or identified from a set of predetermined nodes.

17. The non-transitory storage medium of claim 16, wherein the set of nodes included in the training set represents multiple classes.

18. The non-transitory storage medium of claim 16, wherein the active search iteratively selects nodes predicted by the model to belong to the particular class.

19. The non-transitory storage medium of claim 18, wherein some of the devices are geographically overlapped devices.

20. The non-transitory storage medium of claim 11, wherein some of the devices are included in a different network.

* * * * *